United States Patent Office 3,481,772
Patented Dec. 2, 1969

3,481,772
STRUCTURE FOR DENTAL PROSTHESIS
John S. MacNairn, 508 Nahma, Clawson, Mich. 48017,
Raymond E. La Brecque, 11234 Irvington Drive,
Warren, Mich. 48093, and Samuel A. Nehra, 19980
Wedgewood, Grosse Pointe Woods, Mich. 48236
Filed Oct. 4, 1965, Ser. No. 492,376
Int. Cl. C23d 5/00; B32b 15/04
U.S. Cl. 117—129                                    7 Claims

ABSTRACT OF THE DISCLOSURE

Dental prosthesis structure including a metal base contoured in a desired form and having a glass veneer of substantially the same coefficient of expansion as the metal base bonded to the metal base. The metal base may be either a precious metal or stainless steel, the glass veneer is composed of approximately 47% lead oxide, 32.5% silicon dioxide, 16% sodium oxide, 2.5% boron oxide, and 2% titanium dioxide by weight. The glass composition may vary within predetermined limits.

The glass is bonded to the metal by heating the ingredients to a fluid state, cooling the ingredients to produce glass, pulverizing the glass and subsequently applying the pulverized glass to the metal to be coated and heating the coated metal.

---

The invention relates to dentistry and refers more specifically to a method of and structure and composition of matter for providing a glass coating on precious metals and/or stainless steels for use in conjunction with dental work or the like.

In dental work where it is required to restore teeth or the like, it is often desired to provide a metal member in the form of a portion of a tooth to be built up and to coat the metal member with a substance which will provide a natural tooth appearance. In the past, the metal members which are normally precious metals such as gold, silver, platinum or the like and stainless steels have been coated wtih a plastic or porcelain to provide a natural appearance. Bonding of the plastic and porcelain coatings to the metal is primarily mechanical and the coatings are necessarily of considerable thickness as, for example, two or three millimeters to provide the desired appearance.

In addition, the porcelain coating requires the use of a special high temperature alloy precious metal since the porcelain must be fired at approximately 2100° F. This high temperature firing has restricted the use of porcelain in dental work in the past since at temperatures above approximately 1800° F. the usual solder used to maintain members of dental work in relative position will degrade, weaken and/or distort the joint.

Further, the abrasion resistance of the plastic coating and the impact resistance of the porcelain coating is not as good as is desired. Neither the appearance of the plastic or porcelain veneers on dental work is fully lifelike due to thickness limitations. Also, with plastic and porcelain coatings it is difficult to provide a match between the coefficient of expansion of a coating and the metal being coated to prevent splitting of the coating or relative movement between the coating and metal on cooling which are detrimental to appearance of the finished coating and the bond respectively.

It is, therefore, one of the objects of the present invention to provide improved coating structure for dental work or the like.

Another object is to provide structure for dental work or the like comprising a precious metal or stainless steel base and a glass veneer chemically bonded thereto.

Another object is to provide an improved composition of matter for use in dental work or the like.

Another object is to provide a composition of matter comprising approximately 47% lead oxide, 32.5% silicon dioxide, 16% sodium oxide, 2.5% boron oxide, and 2% titanium dioxide.

Another object is to provide an improved method of glass veneering precious metal or stainless steel for dental work or the like.

Another object is to provide a method of glass veneering precious metal or stainless steel comprising heating the composition of matter set forth above to a liquid state, cooling and pulverizing the composition of matter, coating the metal with the pulverized composition of matter and heating the coated metal.

Another object is to provide a method of, structure and composition of matter for glass veneering precious metal or stainless steel which is simple, economical, efficient and lifelike.

These and other objects and features of the invention will become apparent as the description proceeds, especially when taken in conjunction with the accompanying drawing, illustrating a preferred embodiment of the invention, wherein.

Figure 1:
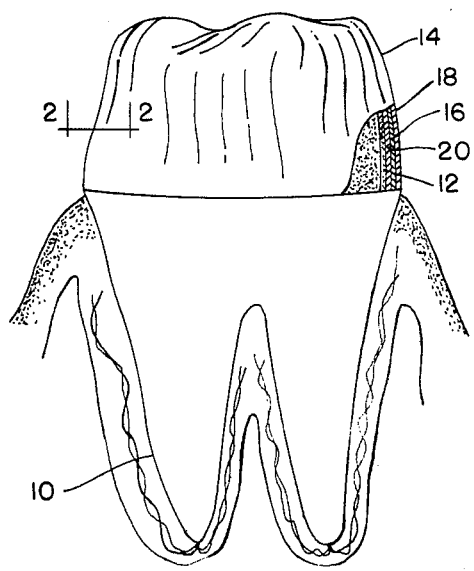
FIGURE 1 is an elevation view of a tooth having a partly broken away glass coated gold cap thereon which is in accordance with the invention.
Figure 2:
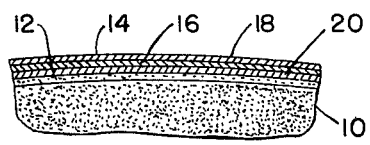
FIGURE 2 is an enlarged section view of a portion of the tooth illustrated in FIGURE 1 taken substantially on the line 2—2 in FIGURE 1.

With particular reference to the figures of the drawing, one embodiment of the present invention will now be considered in detail.

As shown in FIGURE 1, the tooth 10 is provided with a gold crown 12 having a glass coating 14 thereon. The glass coating 14 is essentially a lead boro silicate modified to a crystalline ceramic by the use of additions of sodium oxide and titanium dioxide.

In production the metal 12 is coated with the glass 14 in a pulverized state. The coated metal is then heated to obtain bond between the glass and metal and a natural appearing finish such as that of a normal tooth.

More specifically, the tooth 10 illustrated in FIGURE 1 is prepared for a crown in the usual manner after which the crown 12 of the usual precious metal such as gold alloyed with platinum having a slight trace of zinc therein is formed. The crown may of course be formed of other metals which are not objectionable for dental work such as silver, stainless steel and the like.

A glass composition of matter in then prepared in which the glass has approximately the following percentage composition by weight:

| | | |
|---|---|---|
| PbO | 47% | Lead oxide (±3) |
| $SiO_2$ | 32.5% | Silicon dioxide (−2.5+10) |
| $Na_2O$ | 16% | Sodium oxide (−5+7.5) |
| $B_2O_3$ | 2.5% | Boron oxide (±2) |
| $TiO_2$ | 2% | Titanium dioxide (−0+2%) |

This composition of matter may be varied somewhat. When one element of the composition is varied the other elements are varied while maintaining their relative percentage to each other to accommodate the variation of the one element. The limits of the elements are indicated beyond which the glass compositions are such that the resulting glasses are unusable for the intended coating, lifelike appearance, working temperature range or strength. Thus, the lead oxide content of the glass may range between 44% and 50% by weight while the silicon dioxide content of the glass may range between 30% and 42.5 by weight. The sodium oxide content of the composition of matter may range between 11% and 23.5% by weight while the boron oxide may range between .5% and 4.5% by weight and the titanium dioxide content may range between 2% and 4% by weight.

The ingredients set forth for the glass composition indicated above are then mixed and heated to a fluid state at a temperature of between 2300° F. and 2400° F., for example. The ingredients are then cooled to form glass which is afterward pulverized.

The cooling of the glass composition may be advantageously accomplished by pouring the liquid glass at the elevated temperature into water to form a glass frit. The glass frit may then be pulverized in a ball mill or the like.

The glass is pulverized in an organic or water carrier to form a colloidal solution which resembles milk in consistency.

The colloidal solution is then applied to the gold crown 12 or other dental work such as inlays, partial plates and complete dentures by means such as hand brushing, spraying or immersion of the member to be coated in the liquid. The pulverized glass powder could also be applied to the precious metal or stainless steel to be coated by hot dusting, electrostatic air deposition, or electrochemical bath deposition if desired.

The coated metal is then heated to a temperature below 1800° F., for example 1500° F. to 1550° F., at which temperature the glass in the colloidal solution bonds to the precious metal or stainless steel chemically. It is thought that the chemical bond is due to the affinity of the precious metal such as gold or stainless steel for the lead ions in the glass composition of matter set forth above.

On firing of the coated metal a glossy finish is provided on the metal which due to the titanium dioxide in the composition of matter gives a natural lifelike tooth color and appearance. The color of the glass coating may be altered slightly to match normal teeth. Thus, a small amount of cobalt oxide may be added to the composition of matter to provide a more bluish colored coating. Cadmium oxide or uranium oxide will provide a more yellow color.

Separate glass coatings may be applied to the crown 12 in a plurality of layers 16 and 18 until the desired thickness and appearance is obtained. For each coating the solution is applied over the previous coating and the firing is repeated. When the coating 14 is completed the crown 12 may be secured to the prepared tooth 10 by convenient means such as a dental cement material 20.

The glass coating on the metal dental work constructed by the method outlined with the composition of matter set forth above may be considerably thinner than equivalent plastic or porcelain coatings and does not require high temperature firing detrimental to dental work to which the glass coating is applied. A coating thickness of one millimeter is considered sufficient as compared to two or three millimeters necessary with plastic and porcelain coatings. Further, the precious metal used with the disclosed glass coating may be a normal low temperature dental alloy in contrast to the special high temperature alloy necessary with porcelain coatings. Also, the appearance of the glass coated dental work is considerably more lifelike than similar plastic and porcelain coatings and has much better abrasion and impact resistance than the prior coating materials.

In addition the composition of matter set forth above has a coefficient of expansion which is similar to that of the normal gold dental alloy whereby differential expansion on heating and cooling of the metal and glass will not provide undesirable stresses between the glass and metal to cause either cracking of the glass or creeping thereof which is detrimental to the bond between the glass and metal.

What we claim as our invention is:

1. Structure for dental prosthesis comprising a metal base from the group of precious metals and stainless steel contoured in a desired form and a glass veneer bonded to the metal base which glass veneer has a composition consisting of approximately 47% lead oxide, 32.5% silicon dioxide, 16% sodium oxide, 2.5% boron oxide and 2% titanium dioxide by weight.

2. Structure for dental prosthesis comprising a metal base from the group of precious metals and stainless steel contoured in a desired form and a glass veneer bonded to the metal base which glass veneer has a composition consisting of between 44% and 50% lead oxide, between 30% and 42.5% silicon dioxide, between 11% and 23.5% sodium oxide, between .5% and 4.5% boron oxide, and between 2% and 4% titanium dioxide by weight.

3. Structure as set forth in claim 2, wherein the lead oxide is approximately 47% by weight.

4. Structure as set forth in claim 2, wherein the silicon dioxide is approximately 32.5% by weight.

5. Structure as set forth in claim 2, wherein the sodium oxide is approximately 16% by weight.

6. Structure as set forth in claim 2, wherein the boron oxide is approximately 2.5% by weight.

7. Structure as set forth in claim 2, wherein the titanium dioxide is approximately 2% by weight.

References Cited
UNITED STATES PATENTS

| | | | |
|---|---|---|---|
| 2,467,114 | 4/1949 | Deyrup | 117—129 |
| 3,052,983 | 9/1962 | Weinstein et al. | 32—12 |
| 3,273,242 | 9/1966 | Andrew | 32—12 |

ALFRED L. LEAVITT, Primary Examiner

J. A. BELL, Assistant Examiner

U.S. Cl. X.R.

32—12; 106—35, 53; 117—169